US007263869B2

(12) United States Patent
Durney et al.

(10) Patent No.: US 7,263,869 B2
(45) Date of Patent: Sep. 4, 2007

(54) METHOD FOR FORMING SHEET MATERIAL WITH BEND CONTROLLING GROOVES DEFINING A CONTINUOUS WEB ACROSS A BEND LINE

(75) Inventors: Max W. Durney, San Francisco, CA (US); Rick A. Holman, San Francisco, CA (US); Philip M. Arnold, Redwood City, CA (US)

(73) Assignee: Industrial Origami, Inc., San Francisco, CA (US)

( * ) Notice: Subject to any disclaimer, the term of this patent is extended or adjusted under 35 U.S.C. 154(b) by 46 days.

(21) Appl. No.: 10/931,615

(22) Filed: Aug. 31, 2004

(65) Prior Publication Data

US 2005/0097937 A1 May 12, 2005

Related U.S. Application Data

(63) Continuation-in-part of application No. 10/795,077, filed on Mar. 3, 2004, now Pat. No. 7,152,450, which is a continuation-in-part of application No. 10/256,870, filed on Sep. 26, 2002, now Pat. No. 6,877,349, which is a continuation-in-part of application No. 09/640,267, filed on Aug. 17, 2000, now Pat. No. 6,481,259.

(51) Int. Cl.
*B21D 28/00* (2006.01)
*B32B 3/30* (2006.01)
(52) U.S. Cl. ........................................ 72/324; 428/156
(58) Field of Classification Search ............ 72/324, 72/379.2; 428/152, 156, 167, 172
See application file for complete search history.

(56) References Cited

U.S. PATENT DOCUMENTS 975,121 A 11/1910 Carter
(Continued)

FOREIGN PATENT DOCUMENTS

DE 298 18 909 U1 2/1999
(Continued)

OTHER PUBLICATIONS

Derwent Abstract Accession No. 99-062297/06, Class P52, DE 29818909U (Fortmeier) Dec. 24, 1998.
(Continued)

*Primary Examiner*—Daniel C Crane
(74) *Attorney, Agent, or Firm*—Morgan, Lewis & Bockius LLP; David J. Brezner; Victor E. Johnson

(57) ABSTRACT

A sheet of material (21, 61, 81) formed for control bending along a bend line (23, 63) while maintaining a continuous web of material (26) across the bend line (23, 63). The sheet has at least one groove (22, 62, 82) formed therein with a central groove portion (24, 64, 84) extending in the direction of and positioned proximate to a desired bend line (23, 63). The groove is formed with a continuous web of material (26) at a bottom of the groove (22, 62, 82) and has a configuration defining at least one bending strap (27, 67) extending across the bending line (23, 63) at the end of the groove with a centerline (28) of the bending strap (27, 67) oriented obliquely across the bend line (23, 63) so that a balancing of the forces during bending of the web along the central portion (24, 64, 84) of the grooves and bending of the oblique bending strap occur and control the location of bending of the sheet. A method of preparing a sheet of material (21, 61, 81) for bending while maintaining a continuous membrane (26) across the bend line (23, 63) is also disclosed.

36 Claims, 5 Drawing Sheets

U.S. PATENT DOCUMENTS

| | | |
|---|---|---|
| 1,295,769 A | 2/1919 | Kux |
| 1,405,042 A | 1/1922 | Kraft |
| 1,698,891 A | 1/1929 | Overbury |
| 2,127,618 A | 8/1938 | Riemenschneider |
| 2,560,786 A | 7/1951 | Wright et al. |
| 3,228,710 A | 1/1966 | Chodorowski |
| 3,258,380 A | 6/1966 | Fischer et al. |
| 3,341,395 A | 9/1967 | Weber |
| 3,353,639 A | 11/1967 | Andriussi |
| 3,756,499 A | 9/1973 | Giebel et al. |
| 3,788,934 A | 1/1974 | Coppa |
| 3,854,859 A | 12/1974 | Sola |
| 3,938,657 A | 2/1976 | David |
| 3,963,170 A | 6/1976 | Wood |
| 4,215,194 A | 7/1980 | Shepherd |
| 4,289,290 A | 9/1981 | Miller |
| 4,559,259 A | 12/1985 | Cetrelli |
| 4,628,661 A | 12/1986 | St. Louis |
| 4,837,066 A | 6/1989 | Quinn et al. |
| 4,951,967 A | 8/1990 | Michalik |
| 5,148,900 A | 9/1992 | Mohan |
| 5,157,852 A | 10/1992 | Patrou et al. |
| 5,225,799 A | 7/1993 | West et al. |
| 5,239,741 A | 8/1993 | Shamos |
| 5,262,220 A * | 11/1993 | Spriggs et al. ............... 428/156 |
| 5,302,435 A * | 4/1994 | Hashimoto ................. 428/167 |
| 5,390,782 A | 2/1995 | Sinn |
| 5,524,396 A | 6/1996 | Lalvani |
| 5,568,680 A | 10/1996 | Parker |
| 5,692,672 A | 12/1997 | Hunt |
| 5,701,780 A | 12/1997 | Ver Meer |
| 5,709,913 A | 1/1998 | Andersen et al. |
| 5,789,050 A | 8/1998 | Kang |
| 5,885,676 A | 3/1999 | Lobo et al. |
| 6,132,349 A | 10/2000 | Yokoyama |
| 6,210,037 B1 | 4/2001 | Brandon, Jr. |
| 6,279,288 B1 * | 8/2001 | Keil ........................ 52/653.2 |
| 6,391,424 B1 * | 5/2002 | Suzuki ....................... 428/167 |
| 6,412,325 B1 | 7/2002 | Croswell |
| 6,481,259 B1 | 11/2002 | Durney |
| 6,558,775 B1 * | 5/2003 | Suzuki ....................... 428/167 |
| 6,599,601 B2 | 7/2003 | Fogle et al. |
| 6,640,605 B2 | 11/2003 | Gitlin et al. |
| 6,643,561 B1 | 11/2003 | Torvinen |
| 6,658,316 B1 | 12/2003 | Mehta et al. |
| 6,821,606 B2 * | 11/2004 | Suzuki ....................... 428/167 |
| 6,844,050 B2 * | 1/2005 | Noilhan ....................... 428/172 |
| 2001/0010167 A1 | 8/2001 | Leek |
| 2002/0184936 A1 | 12/2002 | Gitlin et al. |
| 2003/0037586 A1 | 2/2003 | Durney et al. |

FOREIGN PATENT DOCUMENTS

| | | |
|---|---|---|
| GB | 2 129 339 A | 5/1984 |
| JP | 52-068848 | 6/1977 |
| JP | 53-070069 | 6/1978 |
| JP | 55-022468 | 2/1980 |
| JP | 55-055222 | 4/1980 |
| JP | 59-006116 | 1/1984 |
| JP | 02-065416 | 5/1990 |
| JP | 02-165817 | 6/1990 |
| JP | 02-192821 | 7/1990 |
| JP | 02-258116 | 10/1990 |
| JP | 04-033723 | 2/1992 |
| JP | 04-091822 | 3/1992 |
| JP | 05-261442 | 10/1993 |
| JP | 07-148528 | 6/1995 |
| JP | 08-224619 | 9/1996 |
| JP | 10-085837 | 4/1998 |
| JP | 11-123458 | 5/1999 |
| JP | 11-188426 | 7/1999 |
| WO | WO97/24221 | 7/1997 |
| WO | WO 02/013991 A1 | 2/2002 |
| WO | WO 2005/082115 A2 | 9/2005 |
| WO | WO 2005/099925 A2 | 10/2005 |

OTHER PUBLICATIONS

Derwent Abstract Accession No. 1999-340844/29, P52, JP 11 123458 A (Meiji Nat Kogyo KK) May 11, 1999.

Derwent Abstract Accession No. 98-265616/24, P52, JP 10 085837 A (Mitsubishi Electric Corp) Apr. 7, 1998.

Derwent Abstract Accession No. 80-C6243C/12, FR 2428372 A (Merlin & Gerin SA) Feb. 8, 2003.

Derwent Abstract Accession No. 83-G2401K/19, FR 2514103 A (Grun) Apr. 8, 1983.

Publication "Office dA" by Contemporary World Architects, 2000, pp. 15, 20-35, Rockport Publishers, Inc., Gloucester, Massachusetts.

Patent Abstracts of Japan, vol. 015, No. 006 (M-1066), Jan. 8, 1991 (JP 02-258116 A).

Patent Abstracts of Japan, vol. 004, No. 053 (M-008), Apr. 19, 1980 (JP 55-022-468 A).

* cited by examiner

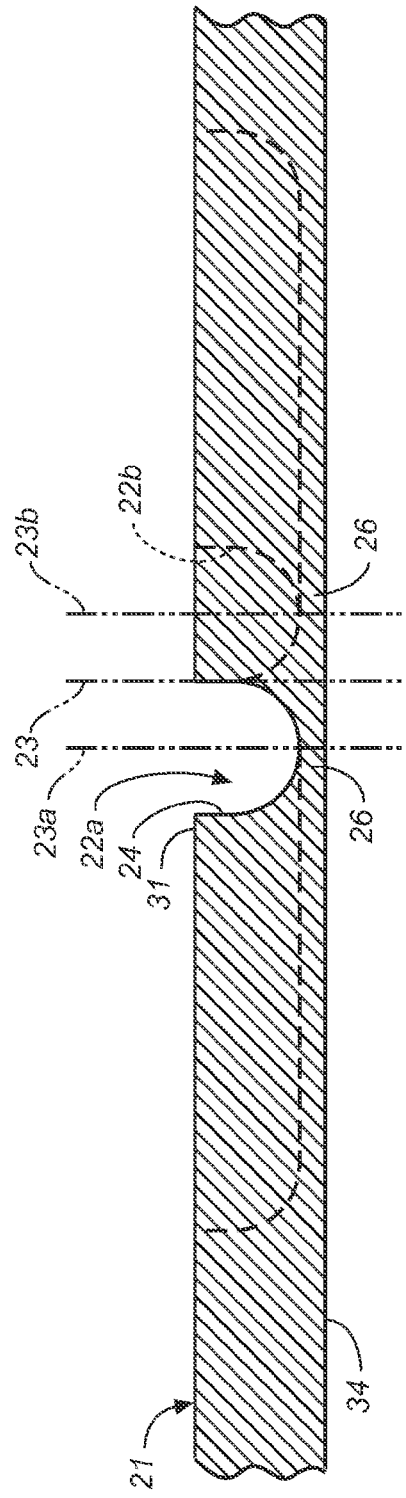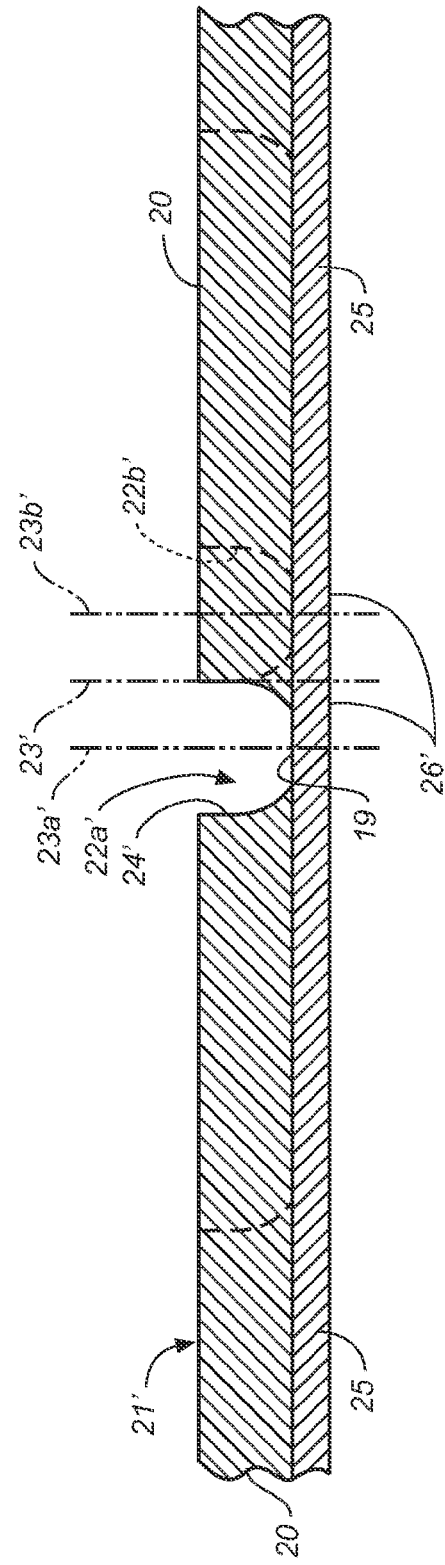

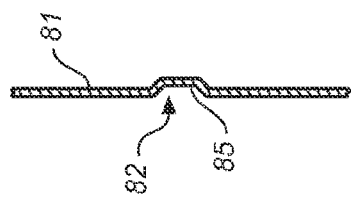
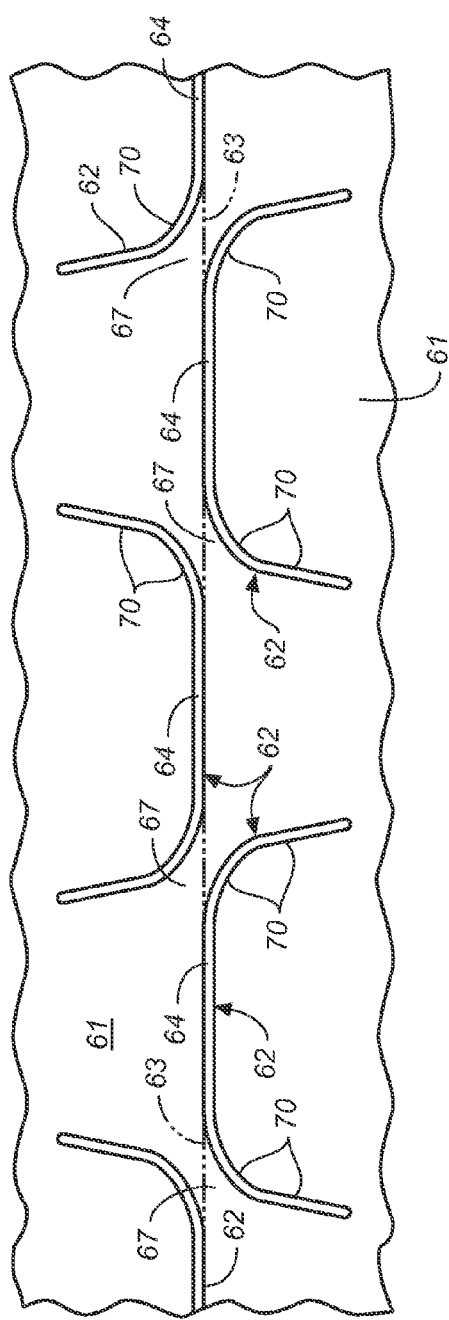
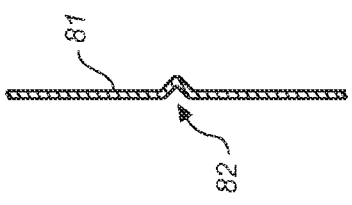
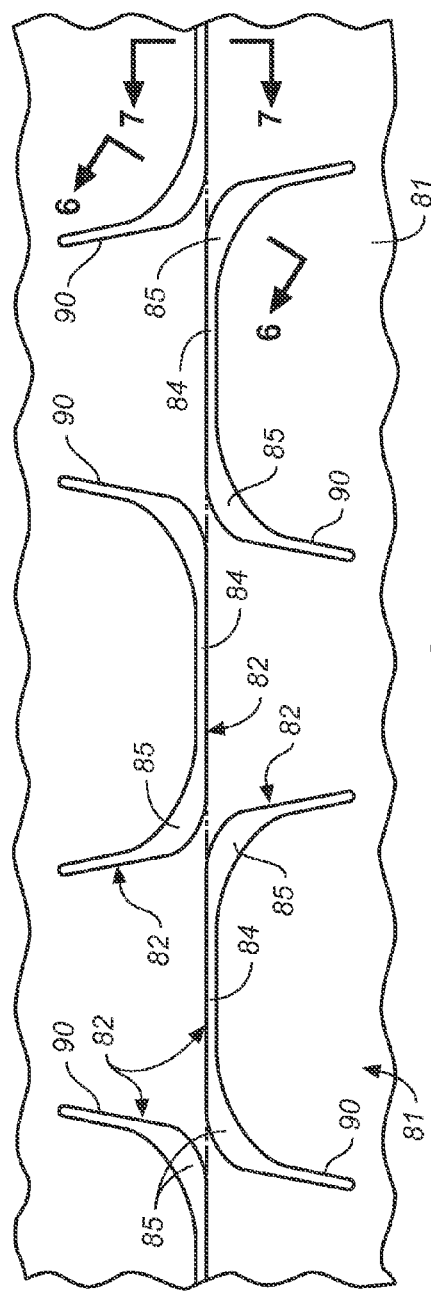

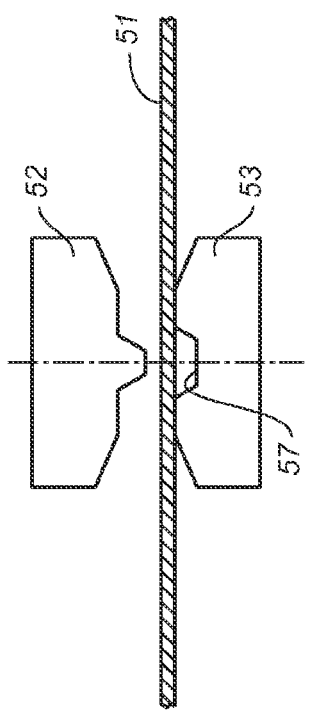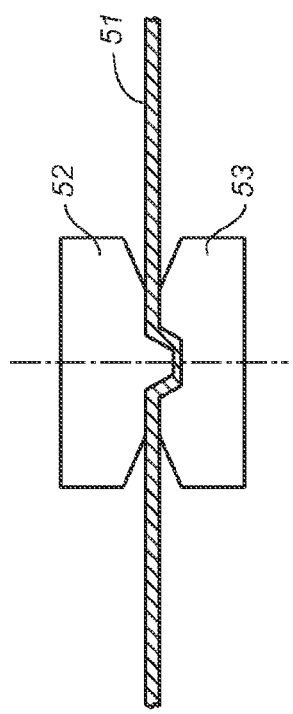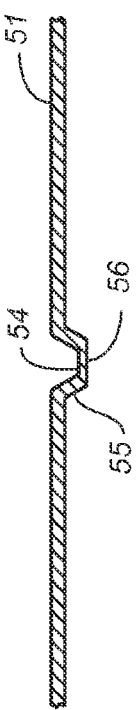
FIG. 9A  FIG. 9B  FIG. 9C
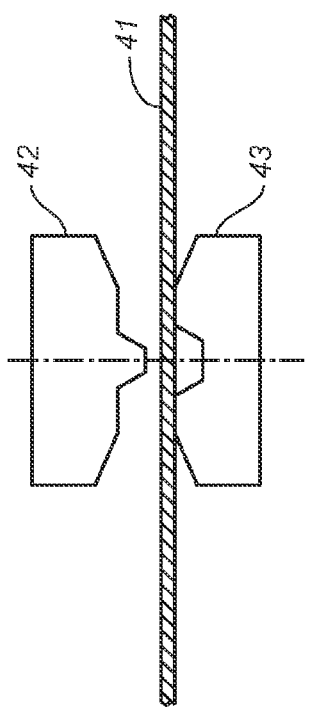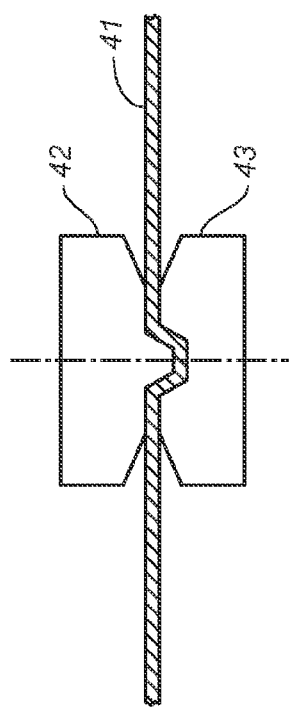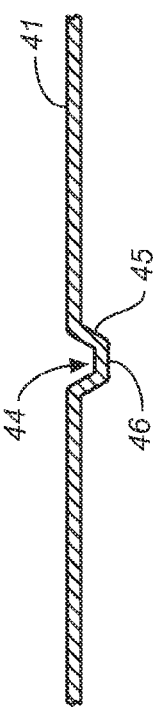
FIG. 8A  FIG. 8B  FIG. 8C

METHOD FOR FORMING SHEET MATERIAL WITH BEND CONTROLLING GROOVES DEFINING A CONTINUOUS WEB ACROSS A BEND LINE

RELATED APPLICATIONS

This application is a continuation-in-part application based upon a patent application Ser. No. 10/795,077, filed Mar. 3, 2004, now U.S. Pat. No. 7,152,450, and entitled Sheet Material with Bend Controlling Displacements and Method for Forming the Same, which is a continuation-in-part application based upon patent application Ser. No. 10/256,870, filed Sep. 26, 2002, now U.S. Pat. No. 6,877,349 and entitled Method for Precision Bending of Sheet Materials, Slit Sheet and Fabrication Process, which was a continuation-in-part application based upon a parent application Ser. No. 09/640,267, filed Aug. 17, 2000, and entitled Method for Precision Bending of a Sheet of Material and Slit Sheet Therefor, now U.S. Pat. No. 6,481,259 B1.

TECHNICAL FIELD

The present invention relates, in general, to precision bending or folding of sheet material, and more particularly, relates to preparing sheet material for bending by grooving the same so that a continuous web or membrane remains at the bottom of the groove, which web extends across the bend line when the sheet is bent.

BACKGROUND ART

The present method and apparatus are based upon sheet slitting and grooving geometries disclosed in depth in the above set forth related applications, which are each incorporated herein by reference in their entireties. In these related applications several techniques or manufacturing processes for forming slits and/or grooves that will precisely control bending of sheet material are disclosed. The emphasis in these related applications is in connection with the use of slits which penetrate completely through the sheet of material. Both slits and grooves or displacements can be provided which control bending by reason of their configuration and the orientation of the bending straps at the ends of the slits or grooves. For slit sheets, edge-to-face engagement of the sheet of material on opposite sides of the slits also is employed to achieve precision in the location of the bends.

These prior related applications also contemplate the use of grooving of the sheet material by various techniques in order to have a sheet of material in which there is a continuous web or membrane at the bottoms of the grooves. Such a web or membrane will allow the bent sheet material to be fluid-tight across the bend line for applications which require containment of a fluid and for use in electronic equipment housings as electromagnetic interference (EMI) shielding.

While in the prior related applications the emphasis was on controlling the location of the bend precisely by using edge-to-face interengagement of the sheet material on opposite sides of the slits or grooves, it has been discovered, and it is an important feature of the invention of the present application, that controlling of the positioning of the bend line on the sheet of material can be accomplished by a combination of groove location and bending straps configuration. Thus, a balancing of bending forces can be set up that will control location of the bend line without the need for edge-to-face interengagement of the sheet material on opposite sides of a slit. This grooving technique allows fluid-tight and EMI shielding housings to be constructed by bending sheet material with grooves and bending straps that control bending with sufficient precision that complex housings for electronic products and fluid-containing applications can be achieved.

Grooving of sheet material in order to facilitate bending is broadly known in the patent literature. Thus, continuous grooves which do not penetrate through a sheet have been used to cause bending of the sheet along the approximate centerline of the grooves. Similarly, discontinuous grooves which are aligned along the bend line also have been used. Finally, grooves which are laterally and longitudinally-offset along opposite sides of a bend line also have been employed as strategy for bending sheet material. Typical of the patent references disclosing these types of grooving techniques is U.S. Pat. No. 6,640,605 to Gitlin et al.

In the Gitlin et al. patent, however, the bending webs between discontinuous grooves have centerlines which are parallel to the desired bend line. This approach requires that the bending straps between grooves undergo substantial twisting, while the continuous webs at the bottom of the grooves are being bent. The approach results in a bend line which has less precision in its location than would be otherwise desirable.

Accordingly, it is an object of the present invention to provide a method of preparing sheet material for bending or folding along a bend line which is capable of producing structures that are fluid-tight, can act as EMI shielding structures, have improved appearance, have additional strength and are corrosion resistant.

Another object of the present invention is to provide a method of preparing sheet material for bending or folding, and the resultant sheet, and the bent or folded structure, which have improved versatility in the ability to vary the bending characteristics and the materials which may be bent into structures.

A further object of the present invention is to provide a method for bending or folding a sheet material, the sheet therefor, and the resultant bent or folded structure formed using the sheet, which employ groove and bending strap configurations in order to control bend line location by balancing the forces in the bending straps during bending.

The grooved sheet material and method for preparing a sheet for bending or folding of the present invention have other objects and features of advantage which will be set forth in more detail in, and will be apparent from, the following Best Mode of Carrying Out the Invention, as exemplified and illustrated by the accompanying drawing.

DISCLOSURE OF THE INVENTION

The method of preparing a sheet of material for bending or folding along a bend line with a continuous membrane or web across the bend line, of the present invention is comprised, briefly, of the step of forming at least one groove in the sheet of material with a central groove portion extending in a direction of, and positioned proximate to, the desired bend line. The groove being formed during the forming step has a continuous membrane of material across the bottom of the groove, or is cut through the sheet and has a layer of material laminated across the cut to result in a grooved, multi-layered sheet. The groove is formed with a configuration and is positioned relative to the bend line to define at least one bending strap at the end of the groove having a centerline oriented to extend obliquely across the bend line.

During bending or folding of the sheet of material, a balancing of the forces produced while bending the membrane and bending the oblique bending strap occurs which controls the location of bending of the sheet of material. Most preferably, a plurality of laterally displaced grooves are formed in the sheet of material along the bend line on opposite sides of the bend line, which grooves also alternate and are longitudinally shifted along the length of the bend line. During the forming step, each groove is formed with opposite groove end portions that diverge away from the bend lines so that the end portions of longitudinally adjacent grooves define a plurality of bending straps having centerlines oriented to extend obliquely across the bend line. The forming step can be accomplished by removing material from the sheet to form the grooves or by displacing the sheet of material in a thickness direction to form grooves on one side of the sheet, and advantageously, to form ribs or ridges on the other side of the sheet. Laminated sheets as well as monolithic sheets may be grooved by cutting through one layer of material with either post- or pre-lamination of a second layer to the sheet.

In another aspect, a sheet of material is provided which is formed for controlled bending along a bend line with a continuous web of material across the bend line. The sheet of material comprises, briefly, a sheet of material having at least one groove formed therein with a central groove portion extending in a direction of, and being substantially parallel to, and positioned proximate to the desired bend line. The groove being further formed with a continuous web of material at the bottom of the groove and having a configuration defining at least one bending strap extending across the bend line at the end of the groove, with the strap having a centerline oriented to extend obliquely across the bend line whereby a balancing of forces during bending of the web along the central portion of the groove and bending of the oblique bending strap control the location of bending of the sheet of material relative to the bend line. Most preferably, a plurality of grooves are provided with diverging groove end portions which define bending straps at opposite ends of the grooves that extend in oppositely inclined, oblique orientations across the bend line so as to balance the bending forces in a manner controlling location of the bend.

DESCRIPTION OF THE DRAWING

FIG. 2 is an enlarged, cross sectional view taken substantially along the plane of line 2-2 of FIG. 1.

FIG. 2A is a cross sectional view, corresponding to FIG. 2, of an alternative embodiment of the present invention illustrating grooving of a laminated sheet of material.

FIG. 4 is a top plan, fragmentary view, corresponding to FIG. 1 of an alternative embodiment of a grooved/ribbed sheet material of the present invention.

FIG. 5 is a top plan, fragmentary view corresponding to FIGS. 1 and 4 of still a further alternative embodiment of a grooved/ribbed sheet of the present invention.

FIG. 6 is a cross sectional view taken substantially along the plane of line 6-6 in FIG. 5.

FIG. 7 is a cross sectional view taken substantially along the plane of line 7-7 in FIG. 5.

FIGS. 8A and 8B are end elevation schematic views, in cross section, of a sheet of material being formed with a groove/rib by forming dies.

FIG. 8C is an end elevation view, in cross section, of the resulting grooved/ribbed sheet of material.

FIGS. 9A and 9B are end elevation schematic views, in cross section, of an alternative embodiment of a sheet being formed with a groove/rib by forming dies.

FIG. 9C is an end elevation view, in cross section, of the resulting grooved/ribbed sheet of material.

BEST MODE OF CARRYING OUT THE INVENTION

Reference will now be made in detail to the preferred embodiments of the present invention, examples of which are illustrated in the accompanying drawings. While the invention will be described in connection with the preferred embodiments, it will be understood that the illustrated embodiments are not intended to limit the invention. On the contrary, the invention is intended to cover alternatives, modifications and equivalents, which may be included within the spirit and scope of the invention, as defined by the appended claims.

Figure 1:
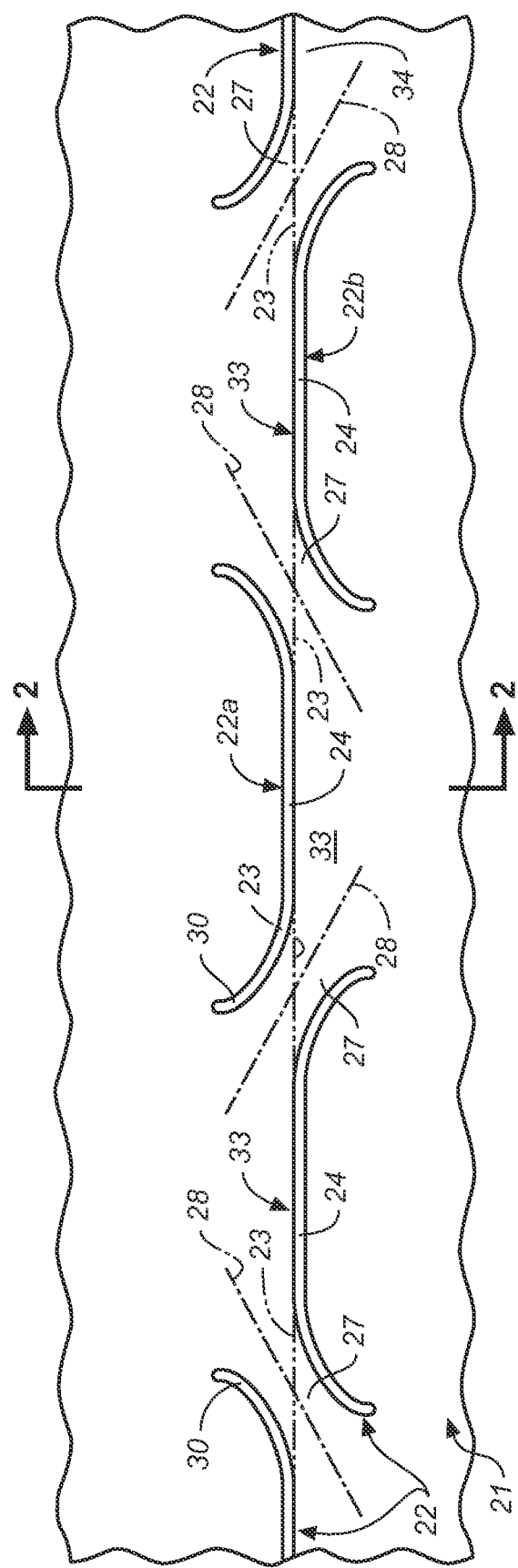
FIG. 1 is fragmentary top plan view of a sheet of material having bend controlling grooves formed therein in accordance with the present invention.
Figure 3A:
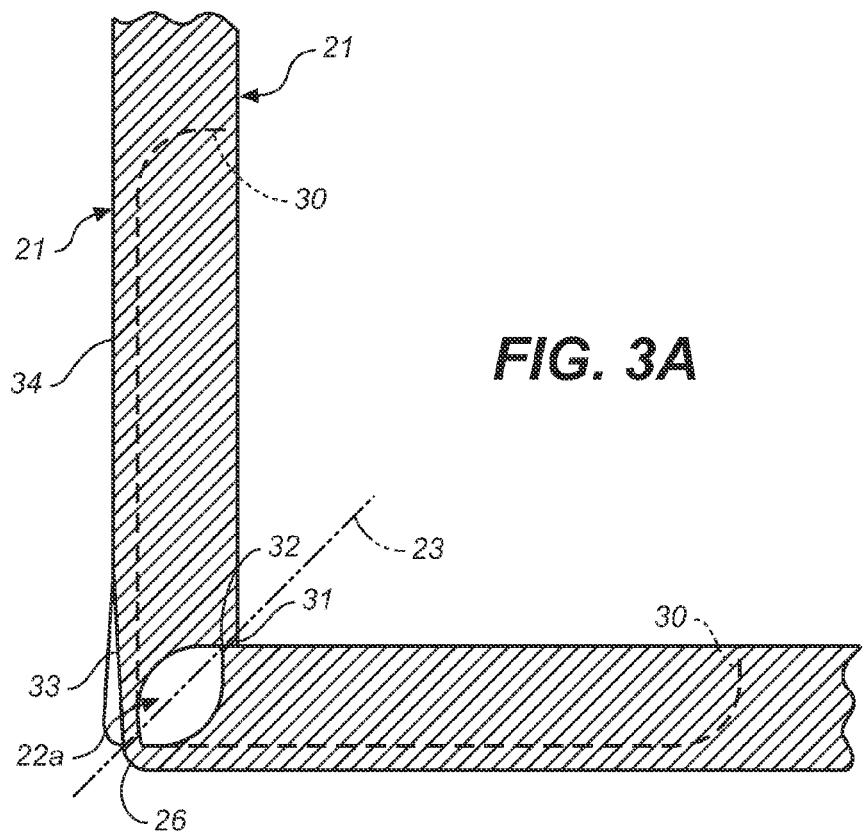
FIG. 3A is an enlarged, cross sectional view corresponding to FIG. 2 with the sheet having been bent by 90 degrees from the position shown in FIG. 2 in a direction closing the grooves.

Referring now to FIGS. 1, 2 and 3A, a sheet of material 21 can be seen to be formed with at least one groove, and as illustrated, with a plurality of grooves 22 along a sheet bend line 23. Grooves 22 extend longitudinally along, and are preferably placed on alternating sides of, bend line 23, with adjacent grooves being in a longitudinally shifted or displaced relationship, as one proceeds longitudinally along the bend line. Each groove 22 has a central groove portion 24 extending substantially parallel to desired bend line 23, and the grooves define at least one bending strap 27, usually between longitudinally adjacent groove end portions. Straps 27 have centerlines 28 oriented to extend obliquely across bend line 23. The grooves, as best may be seen in FIG. 2, do not penetrate completely through sheet 21, but instead define at their bottoms a continuous web or membrane 26 which enables the subsequently folded or bent sheets to present a fluid-tight barrier.

The transverse cross sectional shape of grooves 22 does not have to be U-shaped, as illustrated in FIG. 2, but instead can be V-shaped, a rectangular shape or various other possibilities within the scope of the present invention. Similarly, the depth of the groove and the thickness of web 26 can vary, as will be illustrated and described below.

In a broad aspect, therefore, the grooves are formed so that they control bending of the sheet about bend line 23 by a balancing of the forces during bending. As best may be seen in FIG. 2, groove 22a, at which the cross section is taken, will tend to bend along a groove bend line 23a which will be located where web 26 has a minimum thickness. Similarly, groove 22b, the next or longitudinally adjacent groove, will tend to bend about groove centerline 23b, again at a position at which web 26 at the bottom of groove 22b has a minimum thickness. Obliquely oriented bending straps 27 have centerlines 28 which preferably are skewed along bend line 23 in opposed directions, in a manner which can best be seen in FIG. 1. Thus, the lateral offset of the grooves along the bend line, as well as bending straps 27 at opposite ends of each groove, tend to pull the sheet down against central groove portions 24 of the alternating grooves in a balanced manner. Straps 27 are both bent and twisted during bending of the sheet, but they are balanced at each end of each groove so that the resultant bend line 23 for sheet 21 will be approximately located equidistant between bend lines 23a and 23b. As the jog distance between the groove centerlines 23a and 23b decreases, groove bend lines 23a and 23b tend to be superimposed over sheet bend line 23. As the jog distance between the grooves increases, sheet bend line 23 will tend to stay, on average, equidistant between the two groove bend lines, provided that the jog distance between the grooves is not too great. As the jog distance between grooves 23a and 23b increases, there will come a point at which a plurality of bend lines will form, rather than a single sheet bend line 23. The actual centerline of bending of straps 27, from one groove to another, becomes relatively complex, but for most jog distances, including negative jog distances, the location of sheet bend line 23 will be predictably positioned between the groove bend lines 23a and 23b.

It is believed that the lateral jog between grooves can be reduced to the point that there is no bending strap between side-by-side touching grooves, but there is a lateral jog or distance between the greatest depth of two side-by-side grooves. In that case (not shown in the drawing), the greatest depth of each groove will produce thinnest webs or weakened planes that are laterally offset. The sheet will attempt to bend locally at each weakened plane, which planes are laterally offset in an alternating fashion from each other along the bend line. Thus, a balancing of forces occurs so that bending or folding will be controlled by the lateral jog between alternating groove bottoms and will occur on the desired bend line. A special case of this approach of using a balancing of the web bending forces without having bending straps would be a continuous wave or longitudinally undulating groove which alternatively crosses back and forth along the bend line.

Figure 3B:
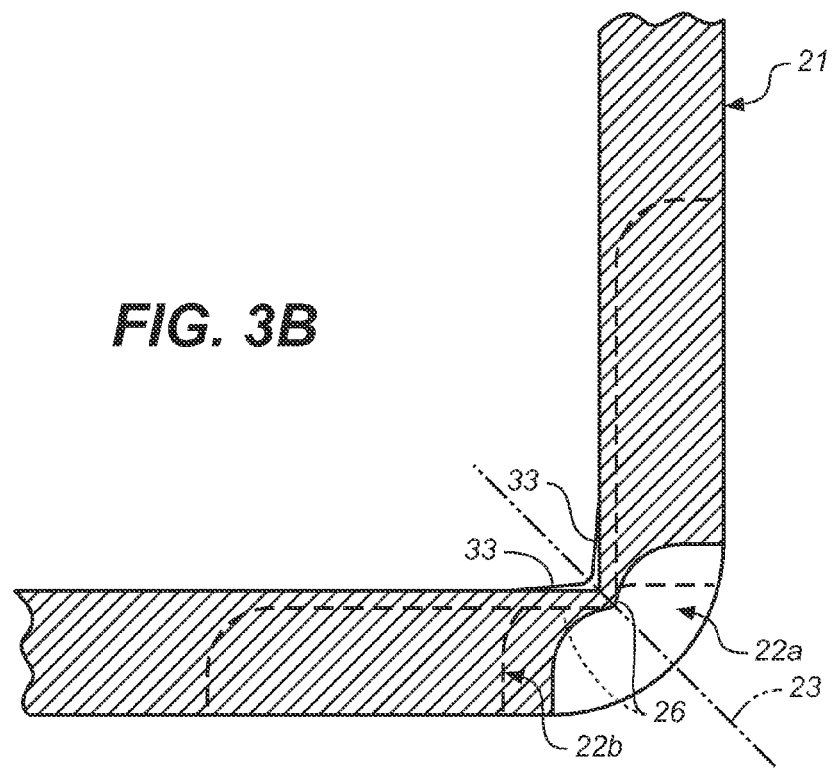
FIG. 3B is an enlarged, cross sectional view corresponding to FIG. 2 with the sheet having been bent by 90 degrees from the position shown in FIG. 2 in a direction opening the grooves.

Returning now to the illustrated embodiments, in FIG. 3A, sheet 21 has been bent in a direction closing grooves 22, while in FIG. 3B, sheet 21 has been bent in an opposite direction opening grooves 22. Both types of bends are within the spirit and scope of the present invention, and the selection as between the two types of bends often will be made based upon the appearance effects. Both types of bends result in a membrane or web 26 that extends across the bend and provides a fluid-tight barrier of the type which is highly desirable for many applications. Moreover, the membrane which extends across the bend can act as a substrate for support of, for example, electrical circuit path or trace that is laid down or deposited on the sheet across the bend. Still further, the web which extends across the bend adds to the strength of the bending straps so that an improvement in the overall bend strength can be realized.

Referring further to FIG. 3A, during the bending process, it should also be noted that bending straps 27 at opposite ends of grooves 22 will pull or snug the side of the sheet between arcuate groove end portions 30 down against central groove portion 24. Thus, sheet 21 is pulled down at area 33 and an inner side 31 of the sheet will slip over the inner side 32 on the opposite side of groove 22a. This pulling down of section 33 during the bend occurs on alternate sides of the bend line along the length thereof. This again effects a balancing of the tension forces in the straps and webs so as to enhance control of the location of sheet bending, and it enhances the overall strength of the bend when the bent structure is loaded.

In FIG. 3B a similar effect occurs when the sheet is bent in the opposite direction. The areas 33 of the sheet between arcuate groove end portions 30 are pulled slightly up or toward a central groove portion 24 on the opposite side of the bend line 23. This occurs at alternating central portions 24 along bend line 23 and again is therefore balanced and makes more predictable the location of bend line 23.

There are numerous ways of grooving sheet material in order to practice the present invention, and it will be understood that any process which is capable of grooving a sheet of material is regarded as being within the spirit and scope of the present invention. Some processes, however, are particularly well suited to specific applications. Grooves 22, as illustrated in FIGS. 1, 2, 3A and 3B, are formed by removing material from sheet 21, and the amount of material removed has a depth dimension less than the thickness dimension of the sheet. The grooves 22 can be advantageously formed, for example, using milling or routing/machining processes, which are particularly well adapted for use in grooving thicker metal sheets. A single point tool also can be employed. Etching, chemical milling and plasma or ion milling can be used advantageously for thinner sheet material and can be used for nano-technology application on metallic and non-metallic sheets. Laser or water jet groove forming can be used, although controlling the depth of penetration of lasers and water jets requires care.

The width and depth of grooves 22, as well as the lateral jog distance between grooves, can be varied. A typical starting place is a groove having a width dimension approximately equal to the thickness dimension of the sheet of material and a depth dimension of about 80 to about 90 percent of the thickness dimension of the sheet of material. These dimensions can be varied considerably, depending upon the particular application and the strength needed for the part or product. In the illustrated groove pattern of FIGS. 1 and 2, it will be seen that the jog distance between centerlines 23a and 23b is approximately equal to the width dimension of the grooves so that sheet bending line 23 is aligned at the aligned edges of alternating grooves 22.

The process and apparatus of the present invention can be used for bending metallic, non-metallic and composite sheet material, as well as laminated layers of metallic and non-metallic materials. Thus, the present invention is particularly well suited for use in the semiconductor industry. As the sheet material becomes thinner, forming the grooves using a chemical etching process also becomes more practical, and eventually one of the more preferable techniques, especially in nano-technology applications.

FIG. 2A illustrates an alternative embodiment of the present invention in which a laminated sheet 21' has been grooved in accordance with the present invention. Sheet 21' is comprised of an upper sheet or layer 20 to which a lower sheet or layer 25 is adhered, bonded or laminated, for example, by an adhesive or thermal bonding process. Layer 20 could, for example, be a sheet of a material having poor ductility, such as a brittle fiberglass or plastic, while layer or sheet 25 could be a very ductile sheet or layer, such as a ductile metal.

Sheet 20 is shown with grooves 22a' and 22b' which preferably have been chemically etched into a metal or plastic sheet. When the etching process reaches the top surface 19 of sheet 25, etching can be stopped, for example, by neutralizing the etching chemicals or by the adhesive layer which bonds layers 20 and 25 together, or by the chemical inertness of the material of layer 25, as compared to the chemical reactivity of layer 20. Grooves 22a' and 22b' correspond to grooves 22a and 22b in FIGS. 1 and 2 and have groove bend lines 23a' and 23b' with sheet bend line 23', as described above for FIGS. 1 and 2.

The grooved laminate sheet 21' will have bending webs 26' that are ductile and facilitate bending in the same manner as shown in FIGS. 3A and 3B, only the sheet will be a laminated sheet.

It also will be obvious to one skilled in the art that laminated sheet 21' of FIG. 2A can be grooved using any or all the techniques set forth above instead of etching. Various combinations of materials can be laminated together to produce various strength, ductility conductivity, erosion resistance and other effects which will not be easily achieved when a single layer of material is used. Laminated sheets also may have, as one form, the mere adherence of a layer of a flexible coating 25, such as, a paint, epoxy, dip brazing layer, etc., which again can have advantages when layer 20 is relatively thin.

While laminating is described above as a pre-grooving step, it will also be understood that layer or sheet 20 can be cut through to form slits and layer 25 laminated or adhered to layer 20 after the slitting occurs. This converts the slits to grooves in which there is a continuous membrane or web 26 across the bottom of what was slits. Laminated sheet 21' also could have more than two layers, and grooves 22a' and 22b' could penetrate less than all the way through upper layer 20 or into lower layer 25, depending on the bending effects desired.

Whether laminated or monolithic sheets are grooved in accordance with the present invention, the grooved sheets with continuous webs can be used in many fluid-tight structures. Thus, hermetically sealed enclosures can be crated to contain partial vacuums or positive pressures. EMI shielded structures can be created, as can boats, heat exchangers, catalytic arrays, vessels and fluid reservoirs, to name only a few of many fluid-tight possibilities.

Additionally, the grooved bent sheets of the present invention, with their continuous webs across the bends, are particularly well suited for use in printed circuit board (PCB) or printed wiring board (PWB) applications because the continuous webs give greater flexibility in the location of conductive paths on the sheet material. While bending straps can also function as support surfaces for PWB or PCB paths when the sheets are slit and discontinuous at the slits, having a continuous web across the bends allows flex circuit paths or flex circuit traces in more locations on crowded boards. Additionally, electrical component or micro device housings, which are mounted to PWB or PCB, also may be advantageously formed using the sheet grooving technique of the present invention.

As shown in FIGS. 5, 6, 7, 8C and 9C, grooves are formed on a front side of the sheet material and ribs are formed on the back side of the sheet by displacing the sheet of material in the thickness direction without severing or penetrating through the sheet. FIGS. 8A-8C and 9A-9C illustrate two techniques for forming the bend line controlling grooves/ribs by displacing the sheet of material. Such displacement can be effected, for example, by stamping, punching and roll forming.

In FIGS. 8A-8C, sheet 41 is positioned for grooving/ribbing using stamping, punching or roll-forming dies, schematically shown at 42 and 43. In FIG. 8A the sheet is placed between dies 42 and 43, and in FIG. 8B the dies are closed so that the male die 42 displaces the sheet of material into the female die 43, with the result being shown in FIG. 8C as a sheet 41 having a groove 44 on a front or upper side of sheet 41 and a ridge or rib 45 on the back or downward side of sheet 41. The groove/rib will advantageously take the longitudinal shape of grooves 22 as shown in FIG. 1, although the dies and groove/rib are only schematically shown in FIGS. 8A-8C as a cross section through the central portion of the groove/rib. As will be seen, bottom 46 of groove 44 is formed as a continuous web or membrane, which again will act as a fluid-tight barrier and a continuous surface across the bent sheet.

In FIGS. 9A-9C, a sheet 51 is being formed by dies 52 and 53, but in this case, the depth of the groove/rib forming surfaces 57 of female die 53 is less than that in FIG. 8A, with the result that the male die 52 will plastically deform and thin web 56 of groove 54. This can best be seen by comparing FIG. 9C to FIG. 8C. Such a groove/rib will have a work-harden web 56 with some increased brittleness. However, work hardening of web 56 will vary with the ductility of the material being formed, and it can be influenced by heat or chemical treatment, if required. Thinner web 56, if the work hardening is neutralized, will generally produce a somewhat easier sheet to bend.

Heat and/or chemical treatment of the webs at the bottoms of grooves formed in accordance with the present invention can be used to influence the bending or folding forces, regardless as to whether or not the webs have been work hardened by the groove forming process. Thus, for metallic and non-metallic materials localized applications of heat or chemicals can be used to anneal or soften the webs and/or bending straps to thereby reduce force required to bend or fold the sheet. Metals with high conductivity will tend to rapidly conduct heat away from the area being annealed, but differential heating or heating and simultaneous cooling or quenching could be employed.

Similarly, chemical softening, particularly of non-metallic or composite sheets also may be feasible, with masking and/or chemical neutralization being used to control the area affected. Chemical softening may be more easy to control than heat treatment since the chemicals will not disperse as quickly as heat is conducted away from the site at which it is applied.

Another way of producing thinned web 56 of FIG. 9C is to use a combination of deforming and removing of material. Thus, the grooved sheet 41 can be abrasively treated or ground on its outside surface so as to thin the thickness of web 46 to that of web 56. Such grinding will involve generation of heat that affects ductility, but generally grinding to produce a reduced web thickness will be an approach in which the ductility and malleability of web 46 will not be as adversely effected as in the process of FIGS. 9A-9C.

As will be seen in FIGS. 8C and 9C, grooves 44 and 54 have a depth dimension which is greater than the thickness dimension of sheets 41 and 51. It also is possible to displace sheets 41 and 51 by an amount that is less than the thickness dimensions of the sheets. This step will also produce ridges or ribs 45 and 55 on the back side of the sheets, but if ribs are not required for stiffness, as set forth below, the back sides of such sheets can have the ribs or ridges ground off flush to the rest of the back side of the sheet. This thins webs 46 and 56 and eliminates the back side ribs 45 and 55.

Turning now to FIG. 4, a sheet grooving and ribbing scheme is shown in which a plurality of grooves/ribs 62 are formed in sheet 61, with each groove/rib again having a central portion 64 which is generally parallel to a bend line 63. End portions 70 diverge away from bend line 23 to define bending straps 67 that have centerlines that are oblique to the bend line 63. In the embodiment shown in FIG. 4, grooves/rib 62 take the form as shown in FIGS. 8C or 9C, namely, the sheet material has been grooved by displacement of the sheet so that the front side of the sheet is grooved at 44 and 54, for example, and the back side of the sheet has a corresponding rib or ridge 45 and 55 which protrudes outwardly of the sheet. When groove/ribbed end portions 70 of the sheet extend a significant distance laterally away from the bend line, the ribs formed on the back side of sheet 61, in effect, stiffen the sheet proximate straps 67 and force straps 67 to bend in the desired location by supporting the sheet against bending in other locations. In the most preferred form, groove/rib end portions 70 extend away from the bend line by distance equal to between about 5 to about 10 times the thickness dimension of the sheet of material.

In FIGS. 5, 6 and 7, a further alternative embodiment of the grooved/ribbed sheet of FIG. 4 is shown in which a transitional areas 85 between the central groove/rib portions 84 and the end groove/rib portions 90 of grooves/ribs 82 have an increased width dimension. This addition area at 85 allows sheet 81 to bend without displacement or puckering in the thickness dimension of the sheet at the transition between the grooves/ribs and the straps.

While the direction of bending of the groove/rib sheet of the present invention can be used to enhance the appearance of the inside or the outside of the bent structure to be formed, it is also possible to use flexible coatings in combination with the present sheet grooving invention. Thus, a thin coating of a flexible material, such as an epoxy or paint can be placed on the grooved sheet prior to bending and then the sheet bent into the desired structure. The adhered coating across the webs at the bottom of the grooves and the straps will flex to accommodate the bend without fracturing or having the coating continuity impaired.

The primary advantage of the apparatus and method of the present invention is that a continuous web or membrane will exist across the bend line to fluid-tight or EMI applications, but the present grooving technique can be used for other applications when it is expected or contemplated that web 26 will fracture upon folding of the sheet. Even when the grooves are too wide for edge-to-face engagement, which produces the high precision material folding as disclosed in the above-referenced related applications, the grooving technique of the present invention will produce bending in predictable locations with sufficient accuracy for many applications that do not require a fluid-tight membrane across the fold.

Having described the apparatus of the present invention, the method of preparing a sheet of material for bending along a bend line with a continuous membrane across the bend line, can be described. The present method includes a step of forming at least one groove in a sheet of material, with a central portion of the groove extending in a direction of the desired sheet bend line. The groove is formed with a continuous membrane or web of material across the bottom of the groove and is further formed with a configuration, and is positioned relative to the bend line, to define at least one bending strap at the end of the groove having a centerline oriented to extend obliquely across the bend line. The resulting sheet will experience a balancing of bending forces produced during bending of the membrane and bending of the oblique bending strap, which balanced forces control the location of bending of the sheet of material. The thin web at the bottom of the groove will provide a weakened plane at which bending will occur along the central portion of the groove, and the end portions of the groove define a strap which will be configured, so as to balance the strap bending forces and predictably position the bend line on the sheet of material. Alternating obliquely oriented straps defined by longitudinally adjacent diverging groove end portions will insure such a balancing of bending forces and, accordingly, the present method also preferably includes the step of forming the groove to define such straps.

The present method can be accomplished using monolithic sheets (FIGS. 1, 2, 3A, 3B) or laminated sheets (FIG. 2A) by removing material from the sheet to form the grooves, or by displacing the sheet in a thickness direction without severing or penetrating the sheet. In one embodiment, the sheet is displaced outwardly to form ribs or ridges on the back side of the sheets, and the end portions of the grooves of the back side of the sheet provide stiffening ridges which extend away from the groove by a distance which reinforces and controls bending of the bending straps. The removal of material can be accomplished using milling, routing, chemical etching, ion milling, laser cutting or water jet cutting of the sheet of material, and displacing of grooves can be accomplished by stamping, punching or roll-forming of the sheet of material. As a further step in the present invention, after the sheet is grooved, the step of bending the sheet of material will be performed to bend the continuous webs and to bend and twist the obliquely oriented bending straps. The sheet can be bent or folded in a direction closing the grooves or in a direction opening the grooves, within the spirit and scope of the method of the present invention.

The invention claimed is:

1. A method of preparing a sheet of material for bending along a bend line with a continuous membrane extending across the bend line comprising the step of:
   forming at least one groove in a sheet of material with a central groove portion extending in a direction of the bend line, the groove having a continuous membrane of material extending across the bottom of the groove, and during the forming step forming the groove with a configuration and at a position relative to the bend line to define at least one bending strap outside of the groove having a centerline oriented to extend obliquely across the bend line whereby a balancing of the forces produced in bending the membrane and bending the oblique bending strap control the location of bending of the sheet of material.

2. The method as defined in claim 1 wherein, during the forming step, a plurality of longitudinally extending grooves are formed in the sheet of material along the bend line on sides of the bend line which alternate along the length of the bend line, and during the forming step, forming each groove with opposite end portions that diverge away from the bend line so that end portions of longitudinally adjacent grooves define a plurality of bending straps extending across the bend line and having centerlines oriented obliquely to the bend line.

3. The method as defined in claim 2 wherein, the forming step is accomplished by removing material from the sheet of material to form grooves having depth dimensions less than the thickness dimension of the sheet of material.

4. The method as defined in claim 2 wherein, the forming step is accomplished by displacing the sheet of material in a thickness direction without severing the sheet of material.

5. The method as defined in claim 4 wherein, the displacing step is accomplished by displacing material outwardly of the sheet of material on a side of the sheet of material opposite the grooved side to form ribs; and the step of after the displacing step, removing material from the ribs to reduce the thickness dimension of the continuous membrane at a bottom of the grooves.

6. The method as defined in claim 5 wherein, during the displacing step, ribs are formed in a back side of the sheet of material; and during the displacing step forming the sheet of material with grooves and ribs having end portions extending away from the bend line in a near perpendicular orientation thereto by a distance sufficient to stiffen the sheet of material and insure bending of the bending straps.

7. The method as defined in claim 6 wherein, during the displacing step areas of transition between central portions of the grooves and end portions of the grooves have an increased transverse width dimension at the tops of the grooves.

8. The method as defined in claim 2 wherein, during the forming step, the grooves are formed with arcuate end portions diverging away from the bend line.

9. The method as defined in claim 3 wherein, the removing step is accomplished by one of milling, routing, chemically etching, ion milling, laser cutting and water jet cutting the sheet of material.

10. The method as defined in claim 4 wherein, the displacing step is accomplished by one of stamping, punching and roll forming the sheet of material.

11. The method as defined in claim 2, and the step of: adhering a flexible coating material to a side of the sheet of material across the bend line.

12. The method as defined in claim 1 wherein, the grooving step is accomplished by grooving an upper layer of a laminated sheet of material having at least two layers superimposed over each other and adhered together.

13. The method as defined in claim 12 wherein, the upper layer of material has lower ductility than the lower layer of material.

14. The method as defined in claim 1 wherein, the forming step includes the steps of slitting completely through a first sheet of material and thereafter adhering a second sheet of material in superimposed relation to the first sheet to provide the continuous membrane across the bottom of the slit to form the groove.

15. The method as defined in claim 14 wherein, the first sheet of material has a ductility less than the second sheet of material.

16. The method as defined in claim 1 wherein, the bend line for the groove will be located where the membrane has a minimum thickness.

17. The method as defined in claim 2 wherein, each groove of the plurality of grooves will have a bend line located where said membrane has a minimum thickness.

18. The method as defined in claim 1, further including the step of bending the sheet of material into a fluid-tight three-dimensional structure.

19. A method of bending a sheet of material to produce a fluid-tight bent structure comprising the steps of: forming a plurality of grooves in a sheet of material along a bend line with each groove having a continuous web of material across a bottom thereof and each having a central portion extending in a direction of the bend line and end portions extending away from the central portion and diverging away from the bend line, the grooves being positioned along the bend line with the end portions of longitudinally adjacent grooves diverging away from opposite sides of the bend line to define bending straps therebetween extending across the bend line with strap centerlines that extend obliquely across the bend line in oppositely inclined directions; and bending the sheet of material to bend the continuous webs and to bend and twist the obliquely oriented bending straps intermediate the grooves to form the bent structure.

20. The method as defined in claim 19 wherein, during the bending step, employing a balancing of forces produced during bending of the webs and bending of the straps to control the location of the bend relative to the bend line.

21. The method as defined in claim 20 wherein, the forming step is accomplished by removing material from the sheet of material to form the grooves.

22. The method as defined in claim 20 wherein, the forming step is accomplished by displacing the sheet of material in the thickness direction to form the grooves in one side of the sheet of material and to form ridges in the other side of the sheet of material.

23. The method as defined in claim 19 wherein, the bending step is accomplished by bending the sheet of material in a direction closing the grooves.

24. The method as defined in claim 19 wherein, the bending step is accomplished by bending the sheet of material in a direction opening the grooves.

25. The method as defined in claim 19 wherein, the bending step is accomplished to form a bent structure for housing electronic components.

26. The method as defined in claim 19 wherein, the bending step is accomplished to form a fluid-tight bent structure.

27. The method as defined in claim 19 wherein, the forming step is accomplished by forming the grooves in a laminated sheet of material having at least two superimposed layers adhered together.

28. The method: as defined in claim 19, and the step of: prior to the bending step treating at least one of the area of the web and the area of the bending straps with one of a heating step and a chemical treatment Step to soften the sheet material in the area to reduce the forces required for the bending step.

29. A method of preparing a sheet of material for bending along a bend line with a continuous membrane extending across the bend line, the sheet of material having a thickness, the method comprising the step of:

forming at least one groove in a sheet of material with a central groove portion extending in a direction of the bend line, the groove having a continuous membrane of material extending across the bottom of the groove, and during the forming step forming the groove with a configuration and at a position relative to the bend line to define at least one bending strap having a thickness and being disposed at an end of the groove having a centerline oriented to extend obliquely across the bend line, wherein the thickness of the bending strap is substantially equal to the thickness of the sheet of material, and wherein a balancing of the forces produced in bending the membrane and bending the oblique bending strap control the location of bending of the sheet of material.

30. The method as defined in claim 29 wherein, during the forming step, a plurality of longitudinally extending grooves are formed in the sheet of material along the bend line on sides of the bend line which alternate along the length of the bend line, and during the forming step, forming each groove with opposite end portions that diverge away from the bend line so that end portions of longitudinally adjacent grooves define a plurality of bending straps extending across the bend line and having centerlines oriented obliquely to the bend line.

31. The method as defined in claim 30 wherein, the forming step is accomplished by removing material from the sheet of material to form grooves having depth dimensions less than the thickness dimension of the sheet of material.

32. The method as defined in claim 30 wherein, the forming step is accomplished by displacing the sheet of material in a thickness direction without severing the sheet of material.

33. The method as defined in claim 32 wherein, the displacing step is accomplished by displacing material outwardly of the sheet of material on a side of the sheet of material opposite the grooved side to form ribs; and the step of alter the displacing step, removing material from the ribs to reduce the thickness dimension of the continuous membrane at a bottom of the grooves.

34. The method as defined in claim 33 wherein, during the displacing step, ribs are formed in a back side of the sheet of material; and during the displacing step forming the sheet of material with grooves and ribs having end portions extending away from the bend line in a near perpendicular orientation thereto by a distance sufficient to stiffen the sheet of material and insure bending of the bending straps.

35. The method as defined in claim 34 wherein, during the displacing step areas of transition between central portions of the grooves and end portions of the grooves have an increased transverse width dimension at the tops of the grooves.

36. The method as defined in claim 30 wherein, during the forming step, the grooves are formed with arcuate end portions diverging away from the bend line.

* * * * *

UNITED STATES PATENT AND TRADEMARK OFFICE
CERTIFICATE OF CORRECTION

PATENT NO. : 7,263,869 B2
APPLICATION NO. : 10/931615
DATED : September 4, 2007
INVENTOR(S) : Durney et al.

It is certified that error appears in the above-identified patent and that said Letters Patent is hereby corrected as shown below:

ON THE TITLE PAGE – Item (63) Related U.S. Application Data

Delete the paragraph and insert the following:

--Continuation-in-part of application No. 10/795,077, filed on Mar. 3, 2004, now Pat. No. 7,152,450, which is a continuation-in-part of application No. 10/672,766, filed on Sep. 26, 2003, now Pat. No. 7,152,449, which is a continuation-in-part of application No. 10/256,870, filed on Sep. 26, 2002, now Pat. No. 6,877,349, which is a continuation-in-part of application No. 09/640,267, filed on Aug. 17, 2000, now Pat. No. 6,481,259.--

Col. 1, beginning at line 8, delete the paragraph and insert the following:

--This application is a continuation-in-part application based upon a patent application Ser. No. 10/795,077, filed Mar. 3, 2004, now U.S. Pat. No. 7,152,450, and entitled Sheet Material with Bend Controlling Displacements and Method for Forming the Same, which is a continuation-in-part application based upon patent application Ser. No. 10/672,766, filed Sep. 26, 2003, now U.S. Pat. No. 7,152,449, and entitled Techniques for Designing and Manufacturing Precision-Folded, High Strength, Fatigue-Resistant Structures and Sheet Therefor, which is a continuation-in-part application based upon patent application Ser. No. 10/256,870, filed Sep. 26, 2002, now U.S. Pat. No. 6,877,349 and entitled Method for Precision Bending of Sheet Materials, Slit Sheet and Fabrication Process, which was a continuation-in-part application based upon a patent application Ser. No. 09/640,267, filed Aug. 17, 2000, and entitled Method for Precision Bending of a Sheet of Material and Slit Sheet Therefor, now U.S. Pat. No. 6,481,259 B1.--

UNITED STATES PATENT AND TRADEMARK OFFICE
CERTIFICATE OF CORRECTION

PATENT NO. : 7,263,869 B2
APPLICATION NO. : 10/931615
DATED : September 4, 2007
INVENTOR(S) : Durney et al.

It is certified that error appears in the above-identified patent and that said Letters Patent is hereby corrected as shown below:

Col. 12, line 28, change "Step" to --step--.

Col. 13, line 5, change "alter" to --after--.

Signed and Sealed this

Fifteenth Day of April, 2008

JON W. DUDAS
*Director of the United States Patent and Trademark Office*